US012650947B2

(12) United States Patent
Hansen et al.

(10) Patent No.: US 12,650,947 B2
(45) Date of Patent: Jun. 9, 2026

(54) UNIVERSAL INTERFACE FOR CABLE CONNECTORS

(71) Applicant: International Business Machines Corporation, Armonk, NY (US)

(72) Inventors: Tyler Hansen, Tucson, AZ (US); Heather Nicole Polgrean, Lagrangeville, NY (US); John S. Werner, Fishkill, NY (US); Jeremy R. Fox, Georgetown, TX (US); Jessica Nahulan, Markham (CA)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 18/794,080

(22) Filed: Aug. 5, 2024

(65) Prior Publication Data
US 2026/0037469 A1 Feb. 5, 2026

(51) Int. Cl.
*G06F 13/40* (2006.01)
*G06F 1/16* (2006.01)

(52) U.S. Cl.
CPC .................................. *G06F 13/409* (2013.01)

(58) Field of Classification Search
None
See application file for complete search history.

(56) References Cited

U.S. PATENT DOCUMENTS 4,504,783 A * 3/1985 Zasio ............... G01R 31/31905
324/750.01
9,152,591 B2 10/2015 Galles et al.

9,742,113 B1 8/2017 Bausch et al.
10,049,066 B2 8/2018 Varanda et al.
2004/0210700 A1 * 10/2004 Hill ...................... H05K 7/1445
710/305

(Continued)

FOREIGN PATENT DOCUMENTS

WO 2023/167953 A1 9/2023

OTHER PUBLICATIONS

"5 Types of Pogo Pin PCB Testing for PCB Manufacturing Process", PCBBUY, Nov. 3, 2021, 8 pages, https://www.linkedin.com/pulse/5-types-pogo-pin-pcb-testing-manufacturing-process-pcbbuyofficial.

(Continued)

*Primary Examiner* — Hyun Nam
(74) *Attorney, Agent, or Firm* — Tihon Poltavets

(57) ABSTRACT

A method for identifying a connector and routing data and/or power to the connector include determining one or more pins from a plurality of pins are depressed on a universal interface for cable connectors device. The method further includes comparing a pin depression pattern for the one or more pins from the plurality of pins to a plurality of supported depression patterns associated with a plurality of supported connectors. The method further includes determining the pin depression pattern matches a first supported depression pattern from the plurality of supported depression patterns for a first supported connector from the plurality of supported connectors. The method further includes enabling, on the universal interface for cable connectors device, one or more internal switches to allow for an electrical connection to at least one pin from the one or more pins from the plurality of pins based on the first support depression pattern.

20 Claims, 5 Drawing Sheets

(56)                References Cited

U.S. PATENT DOCUMENTS

| 2010/0323536 | A1* | 12/2010 | Crane, Jr. ............. | H05K 7/1442 |
| | | | | 439/62 |
| 2015/0070038 | A1* | 3/2015 | Joo .................... | G01R 1/07371 |
| | | | | 324/754.07 |
| 2017/0286353 | A1* | 10/2017 | Tamarkin ............. | G06F 13/4282 |
| 2019/0140409 | A1 | 5/2019 | Solland et al. | |
| 2021/0050735 | A1* | 2/2021 | Chien ................. | H02J 7/00302 |
| 2023/0098043 | A1* | 3/2023 | Yin ........................ | F04B 43/043 |
| | | | | 307/140 |
| 2023/0327383 | A1 | 10/2023 | Scruggs et al. | |
| 2025/0111999 | A1* | 4/2025 | Ennis ........................ | H01H 1/06 |
| 2026/0037469 | A1* | 2/2026 | Hansen ................. | G06F 13/409 |

OTHER PUBLICATIONS

"Bed of nails tester", Wikipedia, retrieved from web dated May 16, 2024, 2 pages, https://en.wikipedia. org/wiki/Bed_of_nails_tester.
"Cable management and labeling—Servers", IBM support, retrieved from web dated May 16, 2024, 9 pages, https://www.ibm.com/support/pages/cable-management-and-labeling-servers.
"Pogo pin", Wikipedia, retrieved from web dated May 16, 2024, 4 pages, https://en.wikipedia.org/wiki/Pogo_pin.

* cited by examiner

100

UNIVERSAL INTERFACE FOR CABLE CONNECTORS

BACKGROUND

This disclosure relates generally to connector interfaces, and in particular to a universal interface for cable connectors with connector identification and routing.

The field of electrical cables includes various types of connectors for supplying power and carrying various types of data between devices. Though many devices utilize similar connector types, there is no standardized universal connector type that is compatible across all devices. Even devices from the same manufacturer often include different connector types across the product lineup.

SUMMARY

Embodiments of the present invention disclose a method, computer program product and computer system for identifying a connector and routing data and/or power to the connector, the method, computer program product and computer system can determine one or more pins from a plurality of pins are depressed on a universal interface for cable connectors device. The method, computer program product and computer system can compare a pin depression pattern for the one or more pins from the plurality of pins to a plurality of supported depression patterns associated with a plurality of supported connectors. The method, computer program product and computer system can determine the pin depression pattern matches a first supported depression pattern from the plurality of supported depression patterns for a first supported connector from the plurality of supported connectors. The method, computer program product and computer system can enable, on the universal interface for cable connectors device, one or more internal switches to allow for an electrical connection to at least one pin from the one or more pins from the plurality of pins based on the first support depression pattern. \

Embodiments of the present invention disclose an apparatus for a universal interface for cable connectors device, the apparatus comprising a plurality of pins protruding from a top plate, wherein each of the plurality of pins is electrically conductive and depressible. The apparatus further comprising one or more internal switches electrically coupled to each of the plurality of pins, wherein the one or more internal switches are configured to control electrical current to each of the plurality of pins.

DETAILED DESCRIPTION

Figure 1:
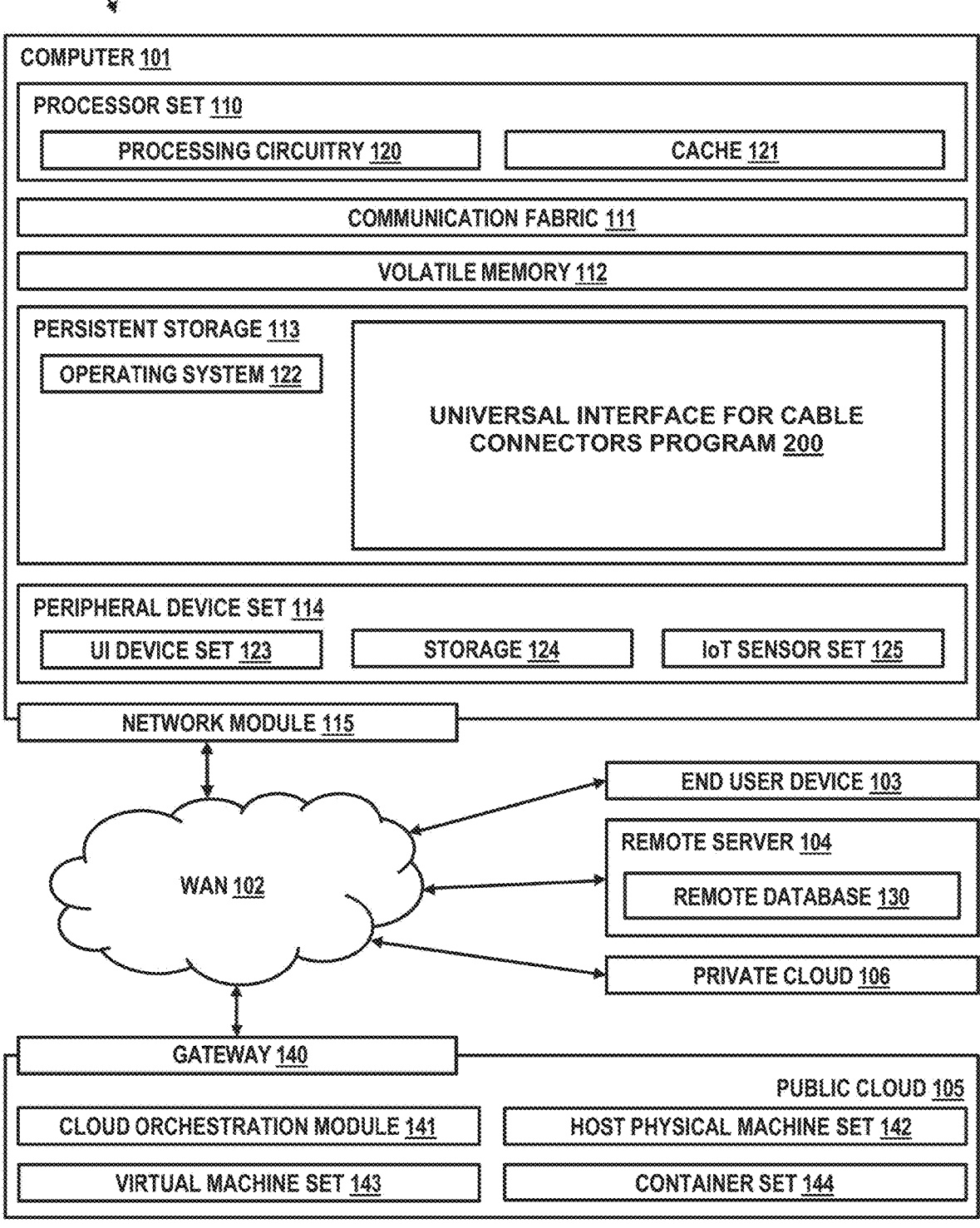
FIG. 1 is a functional block diagram illustrating a computing environment, in accordance with an embodiment of the present invention.

Embodiments of the present invention provide a universal interface for cable connectors device and a universal interface for cable connectors program to receive different cable connector types, identify a configuration for the different cable connector types, and route an electrical connection to pins based on the identified configuration. The universal interface for cable connectors device includes multiple pins for receiving a connector end of a cable, where the multiple pins are depressible, and are mechanical and electrically compatible with the connector end of the cable. As the connector end is inserted into the universal interface for cable connectors device, the multiple pins receive the connector end by depressing to conform to a shape of the connector end. A portion of the depressed multiple pins electrically couple to electrical leads located on the connector end of the cable, as the connector end is seated into the universal interface for cable connectors device. Universal interface for cable connectors program identifies a depression pattern, identifies a connector orientation for the connector end, and enables internal switches to allow for communication and/or power to the portion of the depressed pins that are electrically coupled to the electrical pins of the connector end of the cable. The universal interface for cable connectors device is designed to accommodate a wide range of cable types and connectors. It is compatible with various industry-standard connectors, such as USB, HDMI, Ethernet, and any other connector end of a cable capable of suppling power and/or data.

According to an aspect of the invention, there is provided a computer-implemented method, a computer system, a computer program product that can determine one or more pins from a plurality of pins are depressed on a universal interface for cable connectors device. The computer-implemented method, a computer system, a computer program product can compare a pin depression pattern for the one or more pins from the plurality of pins to a plurality of supported depression patterns associated with a plurality of supported connectors; determining the pin depression pattern matches a first supported depression pattern from the plurality of supported depression patterns for a first supported connector from the plurality of supported connectors. The computer-implemented method, a computer system, a computer program product can enable, on the universal interface for cable connectors device, one or more internal switches to allow for an electrical connection to at least one pin from the one or more pins from the plurality of pins based on the first support depression pattern.

In embodiments, the computer-implemented method, a computer system, a computer program product can analyze one or more pin depressions corresponding to the one or more pins from the plurality of pins depressed on the universal interface for cable connectors device to determine the pin depression pattern.

In embodiments, the pin depression pattern indicates the one or more pin depressions on the universal interface for cable connectors device and a distance of depression for each of the one or more pin depressions.

In embodiments, the computer-implemented method, a computer system, a computer program product can identify a connector orientation based on the pin depression pattern and the first supported depression pattern.

In embodiments, the computer-implemented method, a computer system, a computer program product can extract pinout for a connector associated with the pin depression pattern based on the first supported depression pattern and identify the one or more internal switches to map the least one pin from the one or more pins from the plurality of pins to an appropriate device input/output.

In embodiments, the computer-implemented method, a computer system, a computer program product can supply power to the least one pin from the one or more pins on the universal interface for cable connectors device.

In embodiments, the computer-implemented method, a computer system, a computer program product can send data to the least one pin from the one or more pins on the universal interface for cable connectors device.

According to an aspect of the invention, there is provided an apparatus for a universal interface for cable connectors device. The apparatus includes a plurality of pins protruding from a top plate, where each of the plurality of pins is electrically conductive and depressible. The apparatus further includes one or more internal switches electrically coupled to each of the plurality of pins, where the one or more internal switches are configured to control electrical current to each of the plurality of pins.

In embodiments, the apparatus further includes a plurality of springs mechanically coupled to the plurality of pins. The apparatus further includes a first end of a first spring from the plurality of springs mechanically coupled to a lower portion of a first pin from the plurality of pins. The apparatus further includes a second end of the first spring from the plurality of springs mechanically couple to a lower plate.

In embodiments, the apparatus further includes a plurality of electrical leads coupled to the plurality of pins. The apparatus further includes and a first end of a first electrical lead from the plurality of electrical leads electrically coupled to a lower portion of a first pin from the plurality of pins. The apparatus further includes a second end of the first electrical lead from the plurality of electrical leads electrically coupled to the one or more internal switches.

In embodiments, the apparatus further includes an upper portion of a first pin from the plurality of pins electrically coupled to an electrical connection of a connector end of a cable.

In embodiments, the apparatus further includes a lower portion of the first pin from the plurality of pins is depressed below a depression plane.

In embodiments, the apparatus further includes an upper portion of a second pin from the plurality of pins contacting an outer portion of the connector end of the cable, where a lower portion of the second pin from the plurality of pins is depressed below the depression plane at a distance less than the lower portion of the first pin from the plurality of pins is depressed below the depression plane.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments. It is to be understood that the singular forms "a," "an," and "the" include plural referents unless the context clearly dictates otherwise. Thus, for example, reference to "a component surface" includes reference to one or more of such surfaces unless the context clearly dictates otherwise.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a functional block diagram illustrating a computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 contains an example of an environment for the execution of at least some of the computer code involved in performing the inventive methods, such as, universal interface for cable connectors program 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
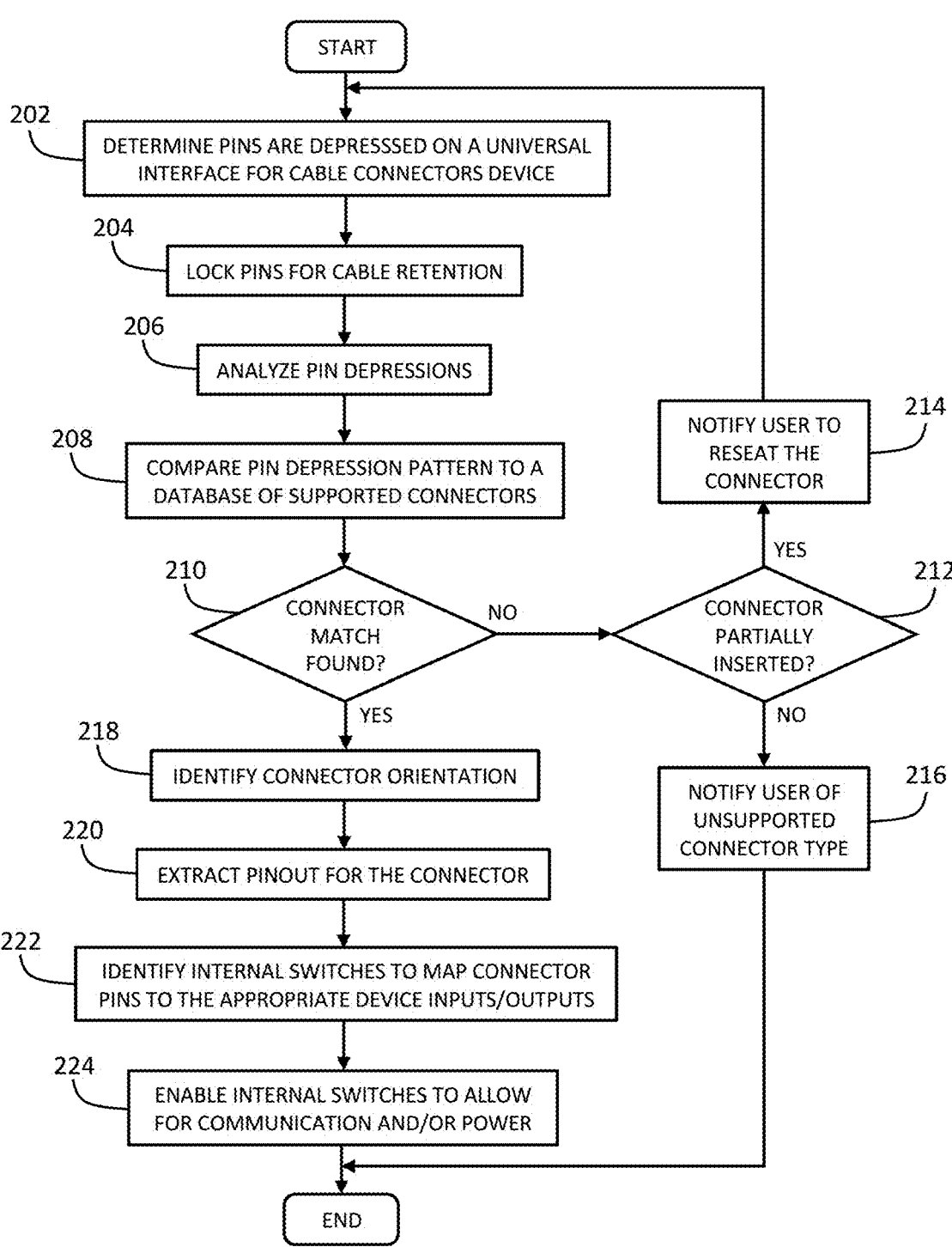
FIG. 2 depicts a flowchart of a universal interface for cable connectors program for identifying a connector and routing data and/or power to the connector, in accordance with an embodiment of the present invention.

FIG. 2 depicts a flowchart of a universal interface for cable connectors program for identifying a connector and routing data and/or power to the connector, in accordance with an embodiment of the present invention.

Universal interface for cable connectors program 200 determines pins are depressed on a universal interface for cable connectors device (202). In this embodiment, the universal interface for cable connectors device includes multiple pins for receiving multiple connector ends of various cables. Each of the multiple pins is depressible into the universal interface for cable connectors device, where a mechanism coupled to each of the multiple pins rebounds the depressed pins once the connector end is removed. An example of a mechanism to rebound each of the depressed pins includes a spring positioned beneath each of the pins, where the spring is compressible to allow for the connector end to depress the pins while the connector end of the cable is inserted into the universal interface for cable connectors device. In some embodiments, a spring constant for each of the springs is such it that prevents the connector end from being forced out from universal interface for cable connectors device. As a connector end of a cable is inserted into a universal interface for cable connector device, universal interface for cable connectors program 200 detects that one or more pins are depressed. Universal interface for cable connectors program 200 determines that one or more pins are depressed based on a depression plane being crossed by each of the one or more pins. An example of a depression plane is discussed in further detail with regards to FIG. 7.

Universal interface for cable connectors program 200 locks pins for cable retention (204). In this embodiment, subsequent to insertion of the connector end of the cable into the universal interface for cable connectors device, universal interface for cable connectors program 200 locks each depressed pin for cable retention. One or more locking mechanism are coupled to each of the multiple pins to lock each depressed pin for cable retention. Universal interface for cable connectors program 200 can utilize a time delay (e.g., 1 second) between a pin crossing the depression plane and an activation of a lock for the pin being depressed. In another embodiment, the spring constant for each of the springs is such that a force exerted by each spring onto the respective pin cannot push the connector end of the cable out of the universal interface for cable connectors device. Therefore, the connector end is retained in the universal interface for cable connectors device until an external force is applied, such as, a user pulling the connector end from the universal interface for cable connectors device. As the connector end is removed from the universal interface for cable connector device, the springs allow for the depressed pins to rebound above the depression plane.

Universal interface for cable connectors program 200 analyzes pin depressions (206). In this embodiment, universal interface for cable connectors program 200 analyzes pin depressions to determine a pin depression pattern for the connector end of the cable. Each connector end of a cable can include an outer portion and inner portion. The outer portion of the connector end of the cable defines an overall shape based on a perimeter of the outer portion. The inner portion of the connector end of the cable defines an area within the outer portion where one or more electrical connections of the connector end of the cable are located. In one embodiment, the inner portion is a cavity located within the outer portion of the connector end of the cable and the inner portion includes the one or more electrical connections. In another embodiment, the inner portion with the one or more electrical connections protrudes beyond the outer portion of the connector end of the cable, such that the one or more electrical connections of the inner portion contact the pins first when the connector end is inserted into the universal interface for cable connectors device.

Universal interface for cable connectors program 200 determines the pin depression pattern for the connector end of the cable based on a depressed portion of pins from the multiple pins of the universal interface for cable connectors device. In some embodiments, universal interface for cable connectors program 200 also utilizes a distance of depression for each of the depressed portion of pins to determine the pin depression pattern. Since each connector end of a cable can include multiple interference planes that contact the outer portion, the inner portion, and the one or more electrical pins of the connector end, universal interface for cable connectors program 200 utilizes the distances of depression for the depressed portions of pins to determine the pin depression pattern.

Universal interface for cable connectors program 200 compares the pin depression pattern to a database of supported connectors (208). In this embodiment, universal interface for cable connectors program 200 utilizes an internal database located on the universal interface for cable connectors device to compare the pin depression pattern to multiple patterns for the supported connectors. Since the connector end of the cable can be inserted in any orientation into the universal interface for cable connectors device, universal interface for cable connectors program 200 compares a pin depression pattern to the database of supported connectors to identify a supported connector. An amount of pins and a spacing of the pins of the universal interface for cable connectors device is such that a connector end of cable is comparable to the database of the supported connectors. In another embodiment, universal interface for cable connectors program 200 utilizes an external database of supported connectors to compare the pin depression pattern to identify the supported connector. The external database can be located on a secondary device (e.g., laptop computer) connected to the universal interface for cable connectors device into which the connector end of the cable is inserted. Alternatively, the external database is located remotely, where the universal interface for cable connectors device utilizes a network connection to communicate to the external database to compare the pin depression pattern to identify the supported connector.

In some embodiments, there can be multiple pin depression patterns for the same supported connector type based on the pin field of the universal interface for cable connectors device. For example, there can be three pin depression mappings that match a USB-C connector end, where the USB-C connector represents a supported connector that is found in the database.

In some embodiments, data that universal interface for cable connectors program 200 gathers from existing connections made in the pin field of the universal interface for cable connectors device can be indicative of the connected device and previously connected components, as to predict and rank expected connection types being made in the event of a conflict of potential connection types being made to the pin field.

Universal interface for cable connectors program 200 determines whether a connector match is found (decision 210). Universal interface for cable connectors program 200 determines whether a connector match is found based on the comparison of the pin depression pattern to the databased of supported connectors. In the event universal interface for cable connectors program 200 determines a connector match is not found ("no" branch, decision 210), universal interface for cable connectors program 200 determines whether the connector is partially inserted into the universal interface for cable connectors device (decision 212). In the event universal interface for cable connectors program 200 determines a connector match is found ("yes" branch, decision 210), universal interface for cable connectors program 200 identifies a connector orientation (218).

Universal interface for cable connectors program 200 determines whether the connector is partially inserted into the universal interface for cable connectors device (decision 212). Universal interface for cable connectors program 200 determines whether the connector end is partially inserted into the universal interface for cable connectors devices based on threshold match value between the pin depression pattern and a candidate supported connector. For example, universal interface for cable connectors program 200 determines that 36 of 40 pins (i.e., 90%) match a pin depression pattern for a candidate supported connector, where universal interface for cable connectors program 200 utilizes a threshold match value of 80%. Therefore, universal interface for cable connectors program 200 determines the connector is partially inserted into the universal interface for cable connectors device. In another example, universal interface for cable connectors program 200 determines that 42 of 64 pins (i.e., ~68%) match a pin depression pattern for a candidate supported connector, where universal interface for cable connectors program 200 utilizes a threshold value of 75%. Therefore, universal interface for cable connectors program 200 determines the connector is not partially inserted into the universal interface for cable connectors device.

In the event universal interface for cable connectors program 200 determines the connector is partially inserted into the universal interface for cable connectors device ("yes" branch, decision 212), universal interface for cable connectors program 200 notifies the user to reseat the connector into the universal interface for cable connectors device (214) and reverts to determining the pins are depressed on the universal interface for cable connectors device (202). In the event universal interface for cable connectors program 200 determines the connector is not partially inserted into the universal interface for cable connectors device ("no" branch, decision 212), universal interface for cable connectors program 200 notifies the user of the unsupported connector type (216). In some embodiments, universal interface for cable connectors program 200 can receive an updated list that includes a new supported connector type from the user, where the updated list includes a pin depression pattern for the new supported connector type and specification information detailing the operational parameters for the new supported connector type. Universal interface for cable connectors program 200 can utilize the updated list with the new supported connector type to compare to the pin depression pattern for the insert connector end of the cable.

Universal interface for cable connectors program 200 identifies a connector orientation (218). As previously discussed, the connector end of the cable is insertable into the universal interface for cable connectors device at any orientation, allowing for the user to insert the connector end into the universal interface for cable connectors device without having to determine a correct orientation prior to insertion. Due to the placement of the multiple pins of the universal interface for cable connectors device, the multiple pins can assist the insertion of the connector end into the universal interface for cable connectors device. Universal interface for cable connectors program 200 identifies a connector orientation based on the pin depression pattern that matched with the supported connector. In some embodiments, universal interface for cable connectors program 200 also determines an orientation of the connector end based on a distance of depression for each of the depressed portion of pins.

Universal interface for cable connectors program 200 extracts pinout for the connector (220). In this embodiment, universal interface for cable connectors program 200 extracts the pinout for the connector based on the identified connector orientation and pin depression pattern that matched with the pin pattern for the supported connector. As previously discussed, the supported connector matched from the database can include specification information which include operational parameters, along with the pinout information for the supported connector that matched to the inserted connector end. In some embodiments, universal interface for cable connectors program 200 also utilizes the distance of depression for each of the depressed portion of pins to extract the pinout for the connector. As previously discussed, each connector end of a cable includes multiple interference planes that contact the outer portion, the inner portion, and the one or more electrical pins of the connector end. Universal interface for cable connectors program 200 utilizes the interference plane for the one or more electrical pins to extract the pinout for the connector.

Universal interface for cable connectors program 200 identifies internal switches to map connector pins to the appropriate device inputs/outputs (222). The universal interface for cable connectors device includes various transistors, switches, relays, and Field-programmable gate array (FPGAs) with erasable program read-only memory (EPROM) to facilitate the routing of electrical connections to one or more pins electrically coupled to one or more pins of the connector end of the cable inserted into the universal interface for cable connectors device. In this embodiment, universal interface for cable connectors program 200 identifies the internal switches to map connector pins to the appropriate device inputs/outputs based on the extracted pinout for the connector end of the cable inserted into the universal interface for cable connectors device.

In some embodiments, universal interface for cable connectors program 200 can maintain and refer to a connector profile map, which may be stored at the OS level or on an external system or cloud available to the universal interface for cable connectors device. As previously mentioned, the connector profile map can include all the supported connectors on the universal interface for cable connectors. Universal interface for cable connectors program 200 can maintain profile mappings for established cable types and various respective information that includes: (a) power and data requirements (b) integrated circuits (ICs), component networks (resistors, capacitors, inductors, diodes, etc.)/device signature-any devices with unique properties to control electrical signatures and unwanted parasitic data can be noted for identifying unique switching configurations (c) communication protocols that universal interface for cable connectors program can handle by the proper circuitry on the device once the switches make the proper signal and power routing connections (d) pin configurations that can detect a cable plugged in any orientation (c) surrounding delta pin errors (e.g., incorrect pin depressions which may usually be seen with cables of certain shapes) (f) connection procedure requirements and steps for one or more switches and relays (g) user configuration specifications (e.g., user's pre-configuring default cable and device setup for prioritization ranking) (h) communication tests with associated expected device responses.

In some embodiments, universal interface for cable connectors program 200 is connected to an external on cloud trained connector profile mapping module and/or a trained module located on the universal interface for cable connectors device. The universal interface for cable connectors device can be trained against common user errors, pin depressions, and errored pin depressions, along with the associated established connection types. Additionally, universal interface for cable connectors program 200 can learn user habits, such as frequent hardware configurations and connections, to identify and rank likely connection type outcomes on a personalized user and setup level. Users can pre-configure setups utilizing a user interface and select setups they are currently operating on or devices they possess. Subsequently, universal interface for cable connectors program 200 can prioritize mappings and connector type profiles from the pre-configured specified hardware and connection types specified by the user in the selected pre-configured layout, allowing the user to then dynamically unplug and re-plug different secondary devices available to them anywhere on the pin grid of the universal interface for cable connectors device.

Universal interface for cable connectors program 200 enables internal switches to allow for communication and/or power (224). In this embodiment, universal interface for cable connectors program 200 enables the internal switches to allow for communication and/or power to the one or more pins of the universal interface for cable connectors device electrically coupled to the one or more pins of the connector end of the cable inserted into the universal interface for cable connectors device.

In some embodiments, universal interface for cable connectors program 200 includes a user interface component. The user interface component can include indicators and/or displays that provide feedback to users about the status of the connection. Users can monitor the interface's behavior and, in some cases, have control over certain aspects, such as prioritizing pins and/or overriding automatic routing. In some embodiments, the user interface can be utilized to resolved conflicts, such as, the verification of a connection type.

In some embodiments, the connector profile map can include all the supported connectors on the device based on the number of pins of the connector, ICs integrated within the device to support switching and different protocols, and routing options based on physical wiring within the device (on PCBs and within internal cabling). The advantage of this is that new cable technologies could be supported via software updates (e.g., profile map, wiring mapping, and connector profile map) if support for different or new cable types are desired without updating the hardware. While components and wiring need to be in place on PCBs, the universal interface for cable connectors device is designed to accommodate a wide range of cable types and connectors.

In some embodiments, pin locking is utilized for cable retention (moving a physical barrier inside the pin to prevent spring compression). Neighboring pins that are not used for electrical connections can help hold the cable into the pin field connector. In some embodiments, sliding doors may be used to protect the pin field when not in use and help to clamp down on the cable to assist with retention when in use. In some embodiments, additional cable retention clips may be implemented in the device for a user to attach after plugging a cable.

Safety mechanisms are integrated into the universal interface for cable connectors device to prevent short circuits, electrical hazards, and/or damage to connected devices. These mechanisms include insulating materials, circuit protection, and fail-safe features.

The power requirements for the universal interface for cable connectors device may vary depending on its specific configuration and use case. Power can be supplied through available power domains within the device, batteries, external power sources, or power-over-cable options, ensuring flexibility in various applications.

Materials used in the construction of the universal interface are selected to ensure durability, conductivity, and safety. Conductive materials are chosen for the spring-loaded pens, and insulating materials are used for other components to prevent electrical interference. The manufacturing process involves specialized techniques to ensure the precision and reliability of the interface.

The universal interface for cable connectors device's physical dimensions and form factor are designed to accommodate diverse applications and space constraints. The universal interface for cable connectors device is customizable to suit various devices and scenarios.

Figure 3:
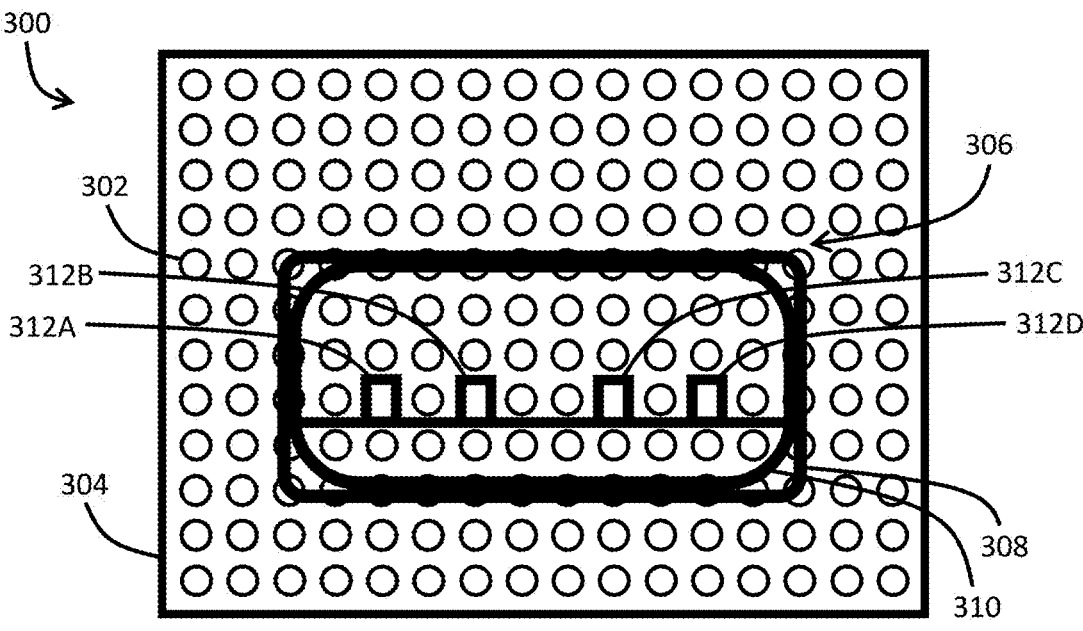
FIG. 3 depicts a top view of multiple pins of a receiving end of a universal interface for cable connectors device with a first connector type outline, in accordance with an embodiment of the present invention.

FIG. 3 depicts a top view of multiple pins of a receiving end of a universal interface for cable connectors device with a first connector type outline, in accordance with an embodiment of the present invention.

In this embodiment, universal interface for cable connectors device 300 includes multiple pins 302 arraigned in a pin field area, where each pin 302 is depressible upon insertion of a connector end of a cable. For discussion purpose, illustrated in FIG. 3 is an enhanced view of portion 304 of universal interface for cable connectors device 300 that includes a 16 pin×12 pin subsection interface area with a total of 192 pins. A number of pins and a size of the interfacing area of universal interface for cable connectors device 300 can vary between embodiments and different applications. First connector type 306 includes outer portion 308 and inner portion 310 with four electrical pins 312A, 312B, 312C, and 312D. Universal interface for cable connectors device 300 is to electrically couple electrical pins 312A-312D to corresponding pins 302, discussed in further detail below with regards to FIG. 4.

Figure 4:
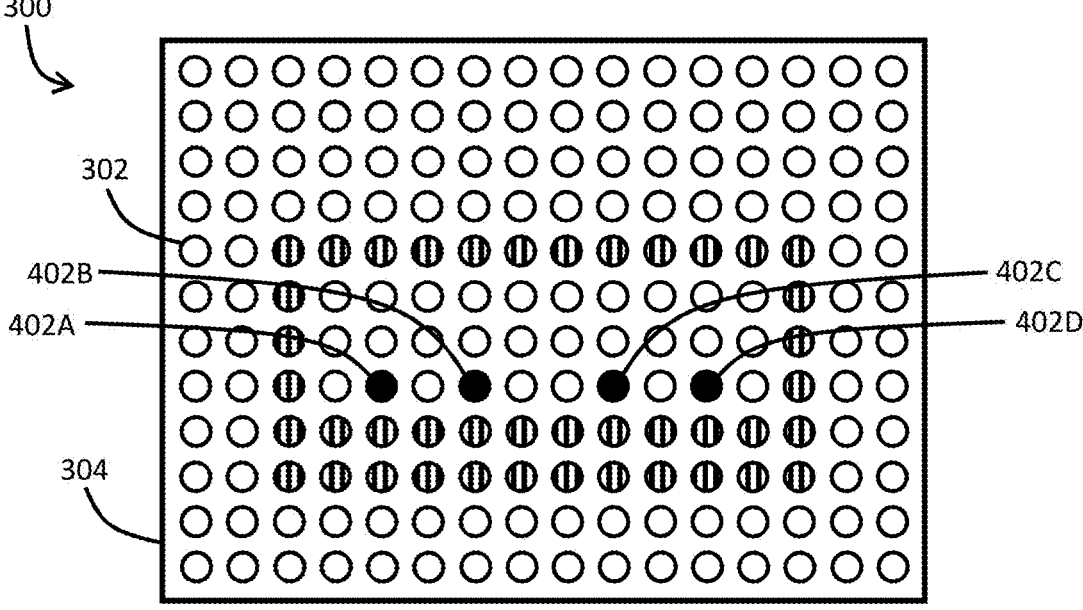
FIG. 4 depicts a top view of multiple pins of a receiving end of a universal interface for cable connectors device with a first configuration for a first connector type outline from FIG. 3, in accordance with an embodiment of the present invention.

FIG. 4 depicts a top view of multiple pins of a receiving end of a universal interface for cable connectors device with a first configuration for a first connector type outline from FIG. 3, in accordance with an embodiment of the present invention.

In this embodiment, universal interface for cable connectors program 200 determines that multiple pins 302 are depressed on portion 304 of universal interface for cable connectors device 300 due to a connector end (i.e., first connector type from FIG. 3) being inserted into universal interface for cable connectors device 300. Universal interface for cable connectors program 200 analyzes the pin depression to identify a pin depression pattern and compares the pin depression pattern to a database of supported connectors. The pin depression pattern illustrated in FIG. 4 includes pattern filled indicators representing depressed pins 302 and sold filled indicators representing pins 402A, 402B, 402C, and 402D. Universal interface for cable connectors program 200 determines a connector match has been found in the database and identifies an orientation for connector inserted into universal interface for cable connectors device 300. Based on the identified connector orientation, universal interface for cable connectors program 200 extracts the pinout for the connector, where pins 402A, 402B, 402C, and 402D are electrically coupled to corresponding pins 312A, 312B, 312C, and 312D of first connector type 306 from FIG. 3. Universal interface for cable connectors program 200 identifies internal switches to map pins 402A, 402B, 402C, and 402D to the appropriate device input/outputs of universal interface for cable connectors device 300 and enables internal switches to allow for communication and/or power to pins 402A, 402B, 402C, and 402D of universal interface for cable connectors device 300.

Figure 5:
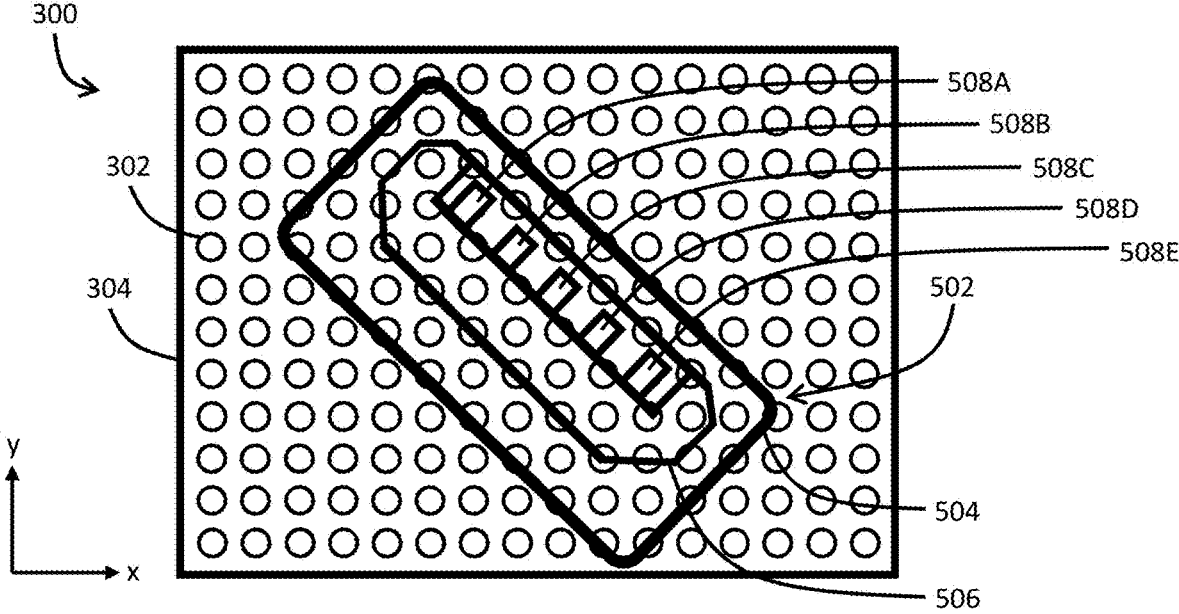
FIG. 5 depicts a top view of multiple pins of a receiving end of a universal interface for cable connectors device with a second connector type outline, in accordance with an embodiment of the present invention.

FIG. 5 depicts a top view of multiple pins of a receiving end of a universal interface for cable connectors device with a second connector type outline, in accordance with an embodiment of the present invention.

Similar to FIG. 3, universal interface for cable connectors device 300 includes multiple pins 302, where each pin 302 is depressible upon insertion of a connector end of a cable. In this embodiment, second connector type 502 is inserted into universal interface for cable connectors device 300 off-axis at a 45° degree angle, where second connector type 502 interfaces within pins located in portion 304 of universal interface for cable connectors device 300. Second connector type 502 includes outer portion 504 and inner portion 506 with five electrical pins 508A, 508B, 508C, 508D, and 508E. Universal interface for cable connectors device 300 is to electrically couple electrical pins 508A-508E to corresponding pins 302, discussed in further detail below with regards to FIG. 6.

Figure 6:
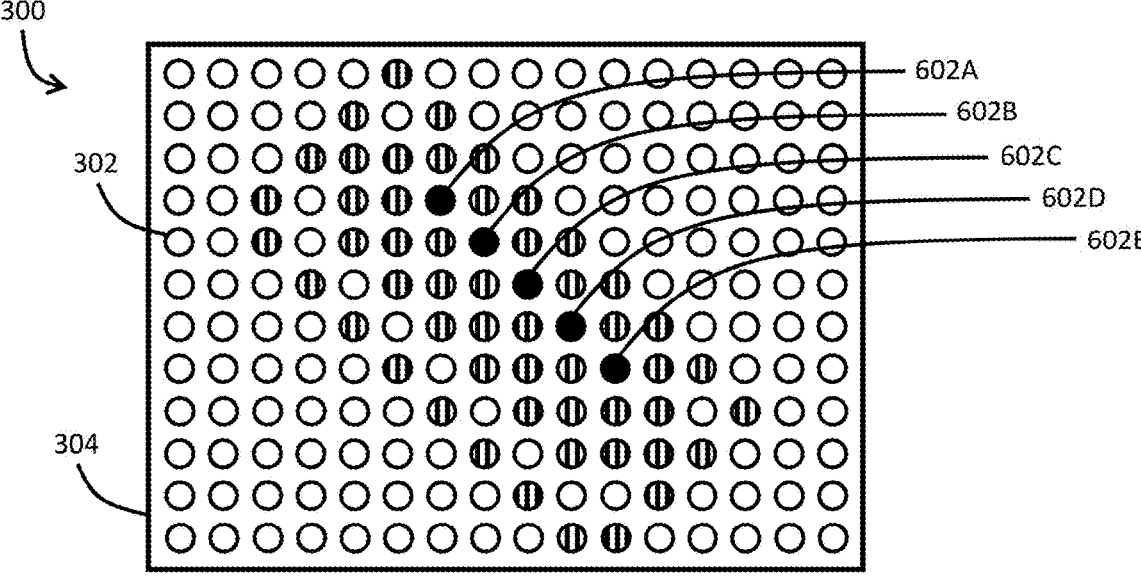
FIG. 6 depicts a top view of multiple pins of a receiving end of a universal interface for cable connectors device with a second configuration for a second connector type outline from FIG. 5, in accordance with an embodiment of the present invention.

FIG. 6 depicts a top view of multiple pins of a receiving end of a universal interface for cable connectors device with a second configuration for a second connector type outline from FIG. 5, in accordance with an embodiment of the present invention.

In this embodiment, universal interface for cable connectors program 200 determines that multiple pins 302 are depressed on portion 304 of universal interface for cable connectors device 300 due to a connector end (i.e., second connector type 502 from FIG. 5) being inserted into universal interface for cable connectors device 300. Universal interface for cable connectors program 200 analyzes the pin depression to identify a pin depression pattern and compares the pin depression pattern to a database of supported connectors. Universal interface for cable connectors program 200 determines a connector match has been found in the database and identifies an orientation for connector inserted into universal interface for cable connectors device 300. Based on the identified connector orientation, universal interface for cable connectors program 200 extracts the pinout for the connector, where pins 602A, 602B, 602C, 602D, and 602E are electrically coupled to corresponding pins 508A, 508B, 508C, 508D, and 508E of second connector type 502 from FIG. 5. Universal interface for cable connectors program 200 identifies internal switches to map pins 602A, 602B, 602C, 602D, and 602E to the appropriate device input/outputs of universal interface for cable connectors device 300 and enables internal switches to allow for communication and/or power to pins 602A, 602B, 602C, 602D, and 602E of universal interface for cable connectors device 300.

Figure 7:
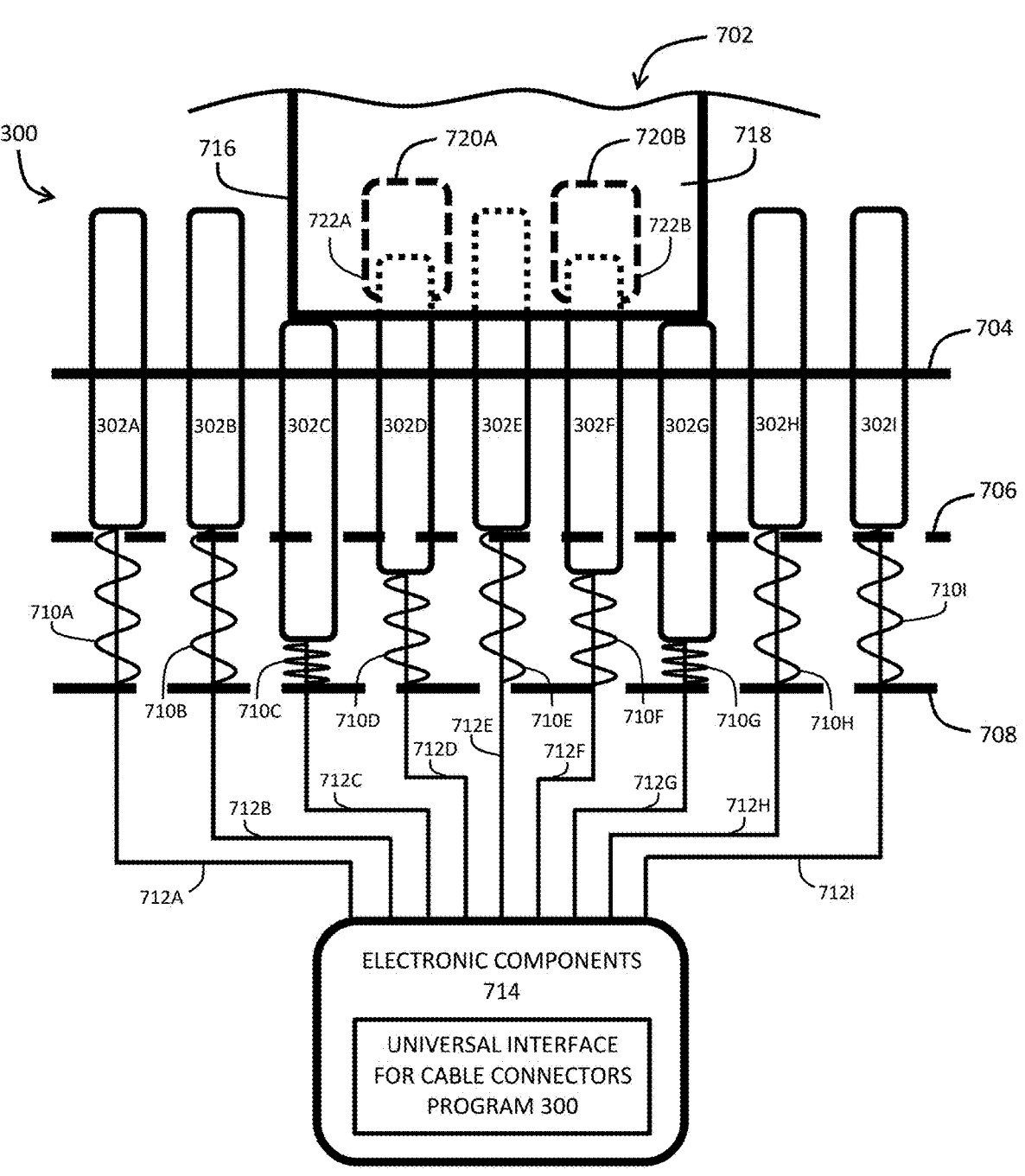
FIG. 7 depicts an example of a universal interface for cable connectors program for routing data and/or power to the multiple pins of a receiving end of a universal interface for cable connectors device, in accordance with an embodiment of the present invention.

FIG. 7 depicts an example of a universal interface for cable connectors program for routing data and/or power to the multiple pins of a receiving end of a universal interface for cable connectors device, in accordance with an embodiment of the present invention.

In this embodiment, third connector type 702 is inserted into universal interface for cable connectors device 300, where third connector type 702 depresses pins 302C, 302D, 302F, and 302G. Top plate 704 represents a surface plane on universal interface for cable connectors device 300 that includes an aperture for every pin 302, where an upper portion of each pin 302 protrudes above top plate 704. Top plate 704 prevents any debris and/or foreign substance from entering any internal components of universal interface for cable connectors device 300. Depression plane 706 is a boundary that universal interface for cable connectors program 200 utilizes to determine when one or more pins 302 are depressed based on a lower portion of the one or more pins 302 crossing depression plane 706. Depression plane 706 is of any area that covers all pins 302 of universal interface for cable connectors device 300, regardless of configuration (e.g., 60 pins by 40 pins).

Lower plate 708 represents base plane in universal interface for cable connectors device 300, where a first end of springs 710A, 710B, 710C, 710D, 710E, 710F, 710G, 710H, and 710I is coupled to a top surface of lower plate 708. A second end of 710A, 710B, 710C, 710D, 710E, 710F, 710G, 710H, and 710I are respectively coupled to a lower portion of pins 302A, 302B, 302C, 302D, 302E, 302F, 302G, 302H, and 302I. In this embodiment, springs 710A-710I are of a helical design. In other embodiments, springs 710A-710I utilizes a lever design with an inherit spring effect. Pins 302A-302I are conductive and a lower portion of pins 302A-302I are respectively coupled to a first end of electrical leads 712A, 712B, 712C, 712D, 712E, 712F, 712G, 712H, and 712I. A second end of electrical leads 712A-712I are coupled to electronic components 714 of universal interface for cable connectors device 300. Electronic components 714 can include various transistors, switches, relays, Field-programmable gate array (FPGAs) with erasable program read-only memory (EPROM), universal interface for cable connectors program 200 to facilitate the routing of electrical connections to one or more pins of pins 302A-302I. In some embodiments, electronic components 714 includes computer 101 from FIG. 1.

In this embodiment, third connector type 702 is inserted into universal interface for cable connectors device 300, where third connector type 702 springs 710C, 710D, 710F, and 710G compress and a lower portion of pins 302C, 302D, 302F, and 302G depress beyond depression plane 706. It is to be noted that FIG. 6 illustrates a cutaway of universal interface for cable connectors device 300 for a portion of a single row of pins 302 and a lower portion of third connector type 702. Third connector type 702 includes outer portion 716 and inner portion 718, where inner portion 718 includes electrical pins 720A and 720B. Pins 302C and 302G are depressed a first length based on outer portion 716 of third connector type 702 compressing spring 710C and 710G a first length. Pins 302D and 302F are depressed a second length based on a cavity being present within inner portion 718 that houses electrical pins 720A and 720B. A top portion 722A of pin 302D and a top portion 722B of pin 302F contacts and electrically couples to respective electrical pins 720A and 720B of third connector type 702.

In this embodiment, universal interface for cable connectors program 200 determines that pins 302C, 302D, 302F, and 302G of universal interface for cable connectors device 300 due to third connector type 702 being inserted into universal interface for cable connectors device 300. Universal interface for cable connectors program 200 analyzes the pin depression to identify a pin depression pattern and compares the pin depression pattern to a database of supported connectors. Universal interface for cable connectors program 200 determines a connector match has been found in the database and identifies an orientation for connector inserted into universal interface for cable connectors device 300. Based on the identified connector orientation, universal interface for cable connectors program 200 extracts the pinout for the connector, where pins 302D and 302F are electrically coupled to corresponding electrical pins 720A and 720B of third connector type 702. Universal interface for cable connectors program 200 identifies internal switches of electronic components 714 to map electrical pins 720A and 720B to the appropriate device input/outputs of universal interface for cable connectors device 300 and enables internal switches to allow for communication and/or power to pins 302D and 302F of universal interface for cable connectors device 300.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

determining one or more pins from a plurality of pins are depressed on a universal interface for cable connectors device;

comparing a pin depression pattern for the one or more pins from the plurality of pins to a plurality of supported depression patterns associated with a plurality of supported connectors;

determining the pin depression pattern matches a first supported depression pattern from the plurality of supported depression patterns for a first supported connector from the plurality of supported connectors; and enabling, on the universal interface for cable connectors device, one or more internal switches to allow for an electrical connection to at least one pin from the one or more pins from the plurality of pins based on the first supported depression pattern.

2. The computer-implemented method of claim 1, further comprising:

analyzing one or more pin depressions corresponding to the one or more pins from the plurality of pins depressed on the universal interface for cable connectors device to determine the pin depression pattern.

3. The computer-implemented method of claim 2, wherein the pin depression pattern indicates the one or more pin depressions on the universal interface for cable connectors device and a distance of depression for each of the one or more pin depressions.

4. The computer-implemented method of claim 1, further comprising:

identifying a connector orientation based on the pin depression pattern and the first supported depression pattern.

5. The computer-implemented method of claim 1, further comprising:

extracting pinout for a connector associated with the pin depression pattern based on the first supported depression pattern; and identifying the one or more internal switches to map the at least one pin from the one or more pins from the plurality of pins to an appropriate device input/output.

6. The computer-implemented method of claim 1, further comprising:

supplying power to the at least one pin from the one or more pins on the universal interface for cable connectors device.

7. The computer-implemented method of claim 1, further comprising:

sending data to the at least one pin from the one or more pins on the universal interface for cable connectors device.

8. A computer system comprising:

a processor set;

one or more computer readable storage media; and program instructions stored on the one or more computer readable storage media to cause the processor set to perform operations comprising:

determining one or more pins from a plurality of pins are depressed on a universal interface for cable connectors device;

comparing a pin depression pattern for the one or more pins from the plurality of pins to a plurality of supported depression patterns associated with a plurality of supported connectors;

determining the pin depression pattern matches a first supported depression pattern from the plurality of supported depression patterns for a first supported connector from the plurality of supported connectors; and enabling, on the universal interface for cable connectors device, one or more internal switches to allow for an electrical connection to at least one pin from the one or more pins from the plurality of pins based on the first supported depression pattern.

9. The computer system of claim 8, wherein the operations further comprise:

analyzing one or more pin depressions corresponding to the one or more pins from the plurality of pins depressed on the universal interface for cable connectors device to determine the pin depression pattern.

10. The computer system of claim 9, wherein the pin depression pattern indicates the one or more pin depressions on the universal interface for cable connectors device and a distance of depression for each of the one or more pin depressions.

11. The computer system of claim 8, wherein the operations further comprise:

identifying a connector orientation based on the pin depression pattern and the first supported depression pattern.

12. The computer system of claim 8, wherein the operations further comprise:

extracting pinout for a connector associated with the pin depression pattern based on the first supported depression pattern; and identifying the one or more internal switches to map the at least one pin from the one or more pins from the plurality of pins to an appropriate device input/output.

13. The computer system of claim 8, wherein the operations further comprise:

supplying power to the at least one pin from the one or more pins on the universal interface for cable connectors device.

14. The computer system of claim 8, wherein the operations further comprise:

sending data to the at least one pin from the one or more pins on the universal interface for cable connectors device.

15. An apparatus for a universal interface for cable connectors device, the apparatus comprising:

a plurality of pins protruding from a top plate of the universal interface for cable connectors device, wherein each of the plurality of pins is electrically conductive and depressible, wherein a portion of the plurality of pins are configured to depress upon insertion of a connector end of a cable, and wherein the portion of the plurality of pins form a pin depression pattern of the universal interface for cable connectors device that matches a supported depression pattern of the connector end of the cable; and one or more internal switches electrically coupled to each of the plurality of pins, wherein the one or more internal switches are configured to control electrical current to each of the plurality of pins.

16. The apparatus of claim 15, further comprising:

a plurality of springs mechanically coupled to the plurality of pins;

a first end of a first spring from the plurality of springs mechanically coupled to a lower portion of a first pin from the plurality of pins; and a second end of the first spring from the plurality of springs mechanically couple to a lower plate.

17. The apparatus of claim 15, further comprising:

a plurality of electrical leads coupled to the plurality of pins;

a first end of a first electrical lead from the plurality of electrical leads electrically coupled to a lower portion of a first pin from the plurality of pins; and a second end of the first electrical lead from the plurality of electrical leads electrically coupled to the one or more internal switches.

18. The apparatus of claim 15, further comprising:

an upper portion of a first pin from the plurality of pins electrically coupled to an electrical connection of the connector end of the cable.

19. The apparatus of claim 18, wherein a lower portion of the first pin from the plurality of pins is depressed below a depression plane.

20. The apparatus of claim 19, further comprising:

an upper portion of a second pin from the plurality of pins contacting an outer portion of the connector end of the cable, wherein a lower portion of the second pin from the plurality of pins is depressed below the depression plane at a distance less than the lower portion of the first pin from the plurality of pins is depressed below the depression plane.

* * * * *